United States Patent
Kumar (10) Patent No.: US 7,076,172 B2
(45) Date of Patent: Jul. 11, 2006

(54) WAVEGUIDE FIBER FOR NOISE SUPPRESSION

(75) Inventor: Shiva Kumar, Painted Post, NY (US)

(73) Assignee: Corning Incorporated, Corning, NY (US)

(*) Notice: Subject to any disclaimer, the term of this patent is extended or adjusted under 35 U.S.C. 154(b) by 672 days.

(21) Appl. No.: 10/192,188

(22) Filed: Jul. 9, 2002

(65) Prior Publication Data
US 2004/0208612 A1    Oct. 21, 2004

(51) Int. Cl.
*H04B 10/12* (2006.01)

(52) U.S. Cl. .................. 398/147; 398/148; 398/149; 398/158; 398/159; 398/160; 398/81; 385/123; 385/124

(58) Field of Classification Search ........... 398/81–92, 398/97, 146–154, 173, 158, 159, 160; 385/123, 385/124
See application file for complete search history.

(56) References Cited

U.S. PATENT DOCUMENTS

| | | | |
|---|---|---|---|
| 4,121,095 A | * | 10/1978 | Endersz et al. .......... 398/214 |
| 6,173,588 B1 | | 1/2001 | Berkey et al. ............. 65/407 |
| 6,567,577 B1 | * | 5/2003 | Abbott et al. ............. 385/24 |
| 6,865,015 B1 | * | 3/2005 | Neuhauser ............... 359/334 |
| 2005/0078352 A1 | * | 4/2005 | Emori et al. ............. 359/334 |

OTHER PUBLICATIONS

Kumar et al., "Quasi-solution Propagation in Dispersion-Managed Optical Fibers", Optics Letters, vol. 22, No. 6, Mar. 15, 1997, pp. 372-374.
Hentschel et al., "EDFA Noise Figure Measurements A Comparison Between Optical and Electrical Techniques", Hewlett Packard, 1994 Lightwave Symposium, pp. 1-16.

* cited by examiner

*Primary Examiner*—Hanh Phan
(74) *Attorney, Agent, or Firm*—Kevin M. Able (57) ABSTRACT

An optical waveguide system exhibiting reduced noise includes a varying dispersion optical waveguide fiber and a high frequency electrical filter. The varying dispersion fiber shifts the frequency spectrum of the noise relative to that of the signal so that the noise can be filtered with substantially no effect on the signal. The varying dispersion fiber is a passive component of the optical system and is compatible with optical connecting and splicing.

13 Claims, 6 Drawing Sheets

WAVEGUIDE FIBER FOR NOISE SUPPRESSION

BACKGROUND OF THE INVENTION

1. Field of the Invention

The invention is directed to a reduced noise optical telecommunication system, and particularly to a reduced noise system incorporating an optical waveguide fiber having total dispersion that varies along the fiber length.

2. Technical Background

To achieve very long length, high data rate optical communication systems, methods for dealing with an accumulation of noise have been proposed and tested. The methods generally focus on regeneration and reshaping of optical signal pulses without resorting to costly, high maintenance, optical to electronic converters. Such electronic converters essentially filter the accumulated noise from the signal, amplify the signal, and reintroduced into the optical system the signal essentially in its originally launched condition. An all-optical solution to the problem of accumulated noise is attractive because optical components are typically less complex and more reliable than those of the optical to electronic converters (sometimes called regenerators in the art).

Sources of noise are integral to most optical systems in that noise arises from spontaneous emission in optical amplifiers, from multiple reflections at splice and connector interfaces, or even from interaction of the signal with the waveguide medium. Thus, strategies for reducing noise usually involve operations directly upon the pulse together with band pass filtering which serves to remove noise without appreciably effecting signal power. Examples of such strategies used in conjunction with soliton signaling include use of amplitude depend gain amplifiers and synchronous shaping of the solitons using, for example, a high speed optical modulator. These strategies are not ideal because the effect of the filtering on signal power is usually significant enough to require the addition of an optical amplifier. In addition, synchronous shaping techniques require complicated electronic clock recovery systems which are expensive. The introduction of additional devices into an optical system adds sources of attenuation and dispersion which must be compensated by other additional components such as optical amplifiers and dispersion compensation devices. In effect, the components used to selectively preserve the signal pulse while filtering noise typically add cost and complexity.

A more efficient solution to the problem of reducing noise in long length, high data rate systems would incorporate optical waveguide fiber. Optical waveguide fiber can be made low in attenuation, relatively low in dispersion, and is compatible with other devices in the optical system in terms of splicing and connecting. In addition, an optical waveguide fiber, as a passive component would not add to maintenance cost of the optical system. The small size and flexibility of an optical waveguide fiber allows it to be configured in any of several packages compatible with the space typically available at the end of an optical communication system.

SUMMARY OF THE INVENTION

An aspect of the invention is a device to reduce noise in an optical waveguide communication system and improve the quality of optical signals propagated through the system. The device includes a length of optical waveguide fiber optically coupled into the communication system, a detector, and an electrical noise filter. The detector converts signals from the length of optical waveguide fiber from optical to electrical form. The electrical noise filter is electrically connected to the detector to selectively filter noise having frequencies higher than the center frequency of the signals. Throughout this specification, in accord with common usage in the art, the signals are characterized by a center frequency and a bandwidth. The center frequency is the frequency of the highest intensity sinusoidal function making up the signal. The bandwidth of the signal spans the range of frequencies of the sinusoidal functions that are superposed to make up the signal. The length of optical waveguide fiber has a total dispersion that varies along the length of the fiber. The variation in total dispersion along the length of the optical waveguide fiber serves to shift the frequency content of the noise. That is, the intensity spectrum of the noise is altered by the length of dispersion varying optical waveguide fiber. A part of the frequency spectrum of the noise is shifted to values higher than the frequency characteristic of the signals. Another part of the frequency spectrum of the noise is coupled to the signal, enhancing the signal intensity. The effect of the length of optical waveguide fiber is to produce signals that are substantially the stationary pulses referred to in the art as solitons. Low frequency noise is incorporated into the signal and the higher frequency noise is filtered after the detector.

In an embodiment of this aspect of the invention, the length of optical waveguide fiber has a dispersion value at its first end, the end farther from the detector, that is higher than the value at its second end located nearer the detector. The total dispersion of the length of fiber decreases from the first to the second end. In this embodiment, a preferred value of total dispersion at the first end of the length of fiber is in a range from about 2 to 4 ps/nm-km and a preferred value at the second end is in a range from about 0.5 to 3.2 ps/nm-km.

In a further embodiment of the invention, the total dispersion of the length of optical waveguide fiber decreases monotonically from the first end to the second end of the fiber. The term monotonic is known in the art and means that total dispersion at any given point along the second length of fiber is lower in value in comparison to the total dispersion at a point closer than the given point to the first end of the second length of fiber.

In another embodiment of the invention, the total dispersion along the length of optical waveguide fiber follows the equation $$d(L) = d(0)\exp(-\Gamma L)\cosh\left[k\left(\frac{1-\exp(-\Gamma L)}{\Gamma}\right)\right],$$

where d(0) is the total dispersion at the first end of the fiber expressed in ps/nm-km, L is distance along the length of fiber expressed in km, k is a constant, and $\Gamma$ is the attenuation coefficient of the fiber expressed in $km^{-1}$.

In a preferred embodiment, d(0) is in a range from about 0.5 to 5 ps/nm-km, k is in the range from about 0.025 km to 1.5 km, and $\Gamma$ is in a range from about 0.04 to 0.08 $km^{-1}$.

In yet another embodiment in accord with this aspect of the invention, the device further includes an additional length of optical waveguide fiber, optically coupled in series arrangement with the length of optical waveguide fiber having varying total dispersion. This additional length of fiber has a total dispersion opposite in sign to that of the length of fiber having varying total dispersion so that the additional length of fiber serves to compensate pulse dispersion caused by the length of fiber having varying total dispersion. The additional fiber thus is called a dispersion compensating fiber. The dispersion compensating fiber can be coupled into the span of fibers included in the optical communication system at essentially any point along the span. However, if the effective area of the compensating fiber length is relatively small, the compensating fiber is advantageously coupled into the span at a point where signal intensity is relatively lower so that non-linear effects are reduced.

In another embodiment of the optical communication system, the signals are characterized by a signal power at the first end (the end nearest the transmitter) of the length of fiber. The length of fiber provides a Q of the system, defined below, which increases as the signal power increases. The length of the length of fiber in this embodiment is selected to provide a maximum value of Q of the system. The term maximum is used with reference to a Q of a system incorporating a device in accord with the invention in which the device includes a fiber of different length from the length that provides maximum Q value. For signal power at the first end of the length of fiber in a range from about 3 dBm to about 12 dBm, Q of the system of this embodiment is not less than about 9.5. The designation dBm is known in the art and refers to a relationship between power ratio and power expressed in milli-watts (mW). In accord with general usage, 0 dBm=1 mW.

Another aspect of the invention is a device to reduce noise and improve signal quality in an optical waveguide fiber communication system including a length of fiber having a total dispersion that decreases along the fiber length. The decrease in total dispersion is in the direction of travel of pulses propagating through the length of fiber. That is, a first end of the length of fiber is optically coupled into the fiber communication system nearer the transmitter and a second end is coupled into the system nearer the detector. The total dispersion of the fiber decreases from the first to the second end. The decrease is in accord with a particular dependence upon fiber length, the dependence chosen so that, together with the non-linear coefficient of the length of fiber, the decreasing total dispersion provides output pulses having uniform intensity. The pulse intensity varies among the pulses by a maximum amount less than about 1.4 dB. Nearest neighbor pulses and next nearest neighbor pulses exhibit a relative intensity variation which is substantially zero. Effectively, the length of fiber has a total dispersion that decreases in accord with a length dependence so that the pulses are substantially solitons, that is, pulses which remain essentially unchanged as they propagate along the fiber length. Solitons are most readily formed in return-to-zero signally formats. In the return-to-zero format, adjacent non-zero pulses are distinguished from each other in the time domain.

A preferred length dependence of the total dispersion is given by the relation for d(L) set forth above.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
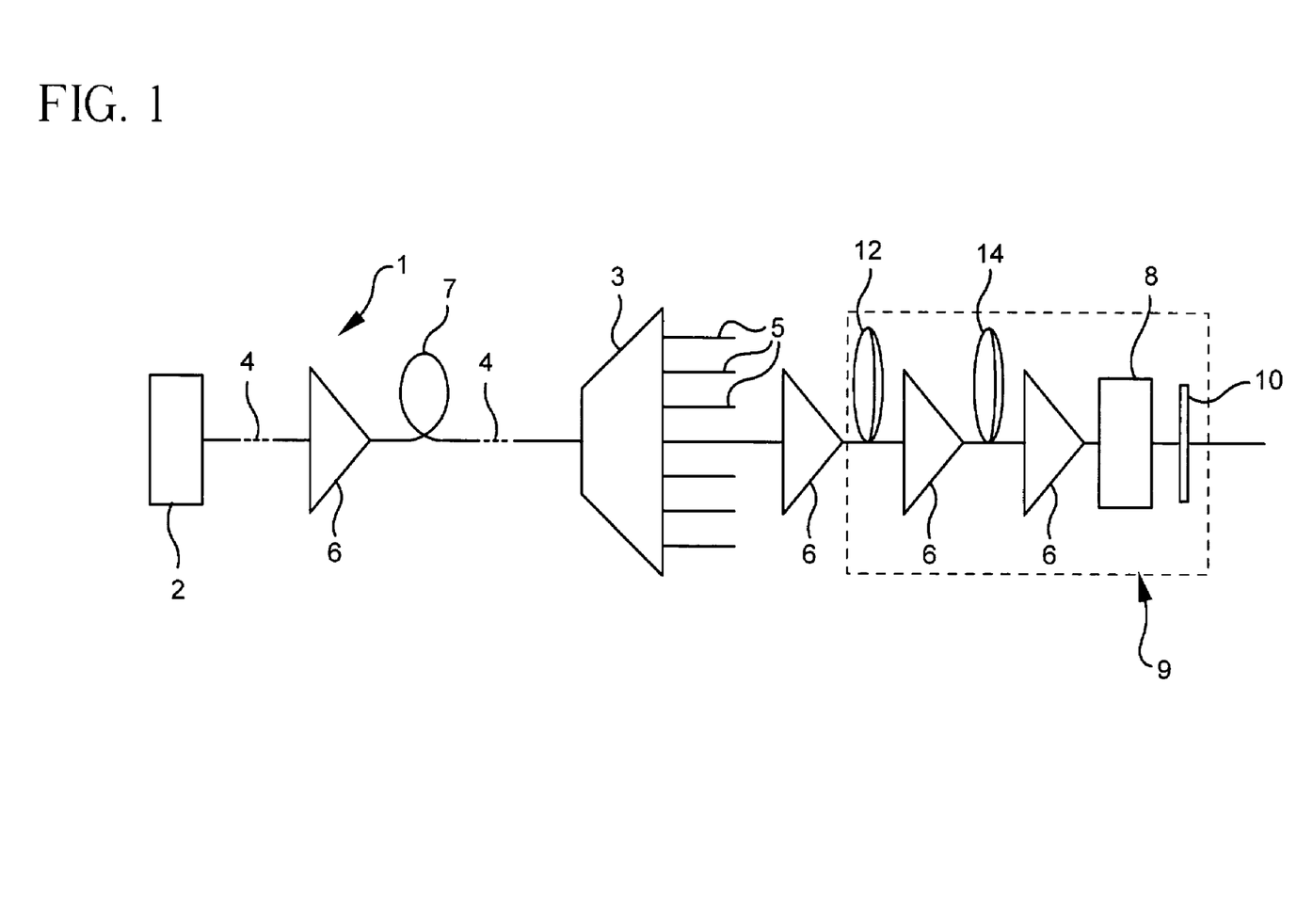
FIG. 1 is a schematic of an optical system incorporating an embodiment of the device of the present invention.

Reference will now be made in detail to a present preferred embodiment of the device, in accord with the invention, for reducing noise and improving signal quality in an optical communication system, an example of which is illustrated as sub-segment 9 of the optical waveguide fiber communication system of accompanying FIG. 1. In FIG. 1, transmitter 2 launches signals into optical path 4 which includes a plurality of spans 1 optically coupled in series arrangement to transmit signals from the transmitter 4 to fiber 5 which inputs the signals to device 9. Spans 1 include optical amplifiers 6 and lengths of optical waveguide fiber 7. Demultiplexer 3 is an optional system element included in FIG. 1 to indicate that the device in accord with the invention can be used in conjunction with wavelength division or time division multiplexing and demultiplexing. In a communication system in which multiplexed signals are launched into optical path 4, demultiplexer 3 serves to separate the multiple signals into the plurality of optical paths 5 exiting demultiplexer 3. Optical amplifiers 6 are optically coupled into the system in locations that compensate for reduction in signal intensity due to the optical waveguide fibers and components that make up the system. Thus, beginning at transmitter 2, first optical amplifiers 6 compensates for reduction in signal intensity due to optical waveguide fibers 7. Amplifier 6 positioned immediately after demultiplexer 3 compensates losses experienced by the signal in demultiplexer 3 and also boosts the signal power input to sub-component 9 so that the nonlinear effects and varying dispersion of fiber 12 of the device can serve to form stationary pulses. Amplifiers 6 positioned after varying total dispersion fiber 12 and dispersion compensating fiber 14, respectively, compensate for signal intensity reduction due to transmission through optical waveguide fibers 12 and 14.

Optical waveguide fiber 12 can have a total dispersion that decreases from the first end of the fiber, the end located nearest transmitter 2, to the second end of the fiber, optically coupled into optical amplifier 6. Essentially the total dispersion of length of fiber 12 can be made to vary along the length of fiber 12 is any pre-selected way. Methods for manufacturing optical waveguide fiber having total dispersion that varies along the fiber length are known in the art and are taught for example in U.S. Pat. No. 6,173,588, Berkey et al., which is incorporated herein by reference in its entirety. Dispersion compensating fiber 14, also known in the art, is designed to compensate the dispersion of the signals due to their passage through fiber 12. As is taught for example in U.S. Pat. No. 4,715,679, Bhagavatula, incorporated herein by reference in its entirety, the total dispersion or total dispersion slope of an optical waveguide fiber can be made to have substantially any value by adjusting the refractive index profile of the fiber core. Thus, the dispersion or dispersion slope of one fiber can be made to compensate that of another fiber in an optical system. Detector 8 converts the signals from optical to electrical form and electrical filter 10 is selected to filter, that is, remove, electrical signals having a frequency higher than the center frequency of the signal and preferably signals having frequencies higher than the higher frequency end of the signal bandwidth. Filter 10 is thus denoted a low pass. Filter 10 is selected to pass the signal frequency bandwidth and so does not appreciably effect the intensity of the signal.

The mechanism through which dispersion varying fiber 12, together with electrical filter 10, acts to effectively reduce noise and improve signal quality is set forth as follows. It will be understood that the accuracy of the explanation in no way limits the invention and is not essential to the function or use thereof. As signal and noise propagate along the dispersion varying fiber 12, the signal pulses are gradually converted to stationary pulses or solitons. In the formation of these solitons, signal photons as well as noise photons participate. The fraction of the signal and noise intensity that does not become part of the solitons, gives rise to high frequency noise which is filtered out of the signal by low pass electrical filter 10 after optical to electrical conversion of the pulses in the detector.

As the signals pass through varying total dispersion fiber 12, the signal pulses are selectively modulated due to the fact that their intensity is greater than that of the noise co-propagating with the signals. The noise frequency spectrum is shifted to higher values relative to the signals, producing a frequency separation between signals and noise. Varying total dispersion fiber 12 serves to suppress low frequency noise and condition the noise so that it may be filtered by low pass (higher frequencies are removed) filter 10 without effecting the signal intensity. Optical waveguide fiber 12 by its nature is a passive element (i.e., it does not require a separate power source and need not be adjusted after installation) of the system that is relatively low loss, low cost, and is splice and connector compatible with other elements of the system. Filter 10 is also a readily available, low cost, passive system element. Thus the noise reduced optical communication system incorporating the device in accord with the invention can be expected to be reliable and essentially maintenance-free in addition to its other advantages.

Figure 6:
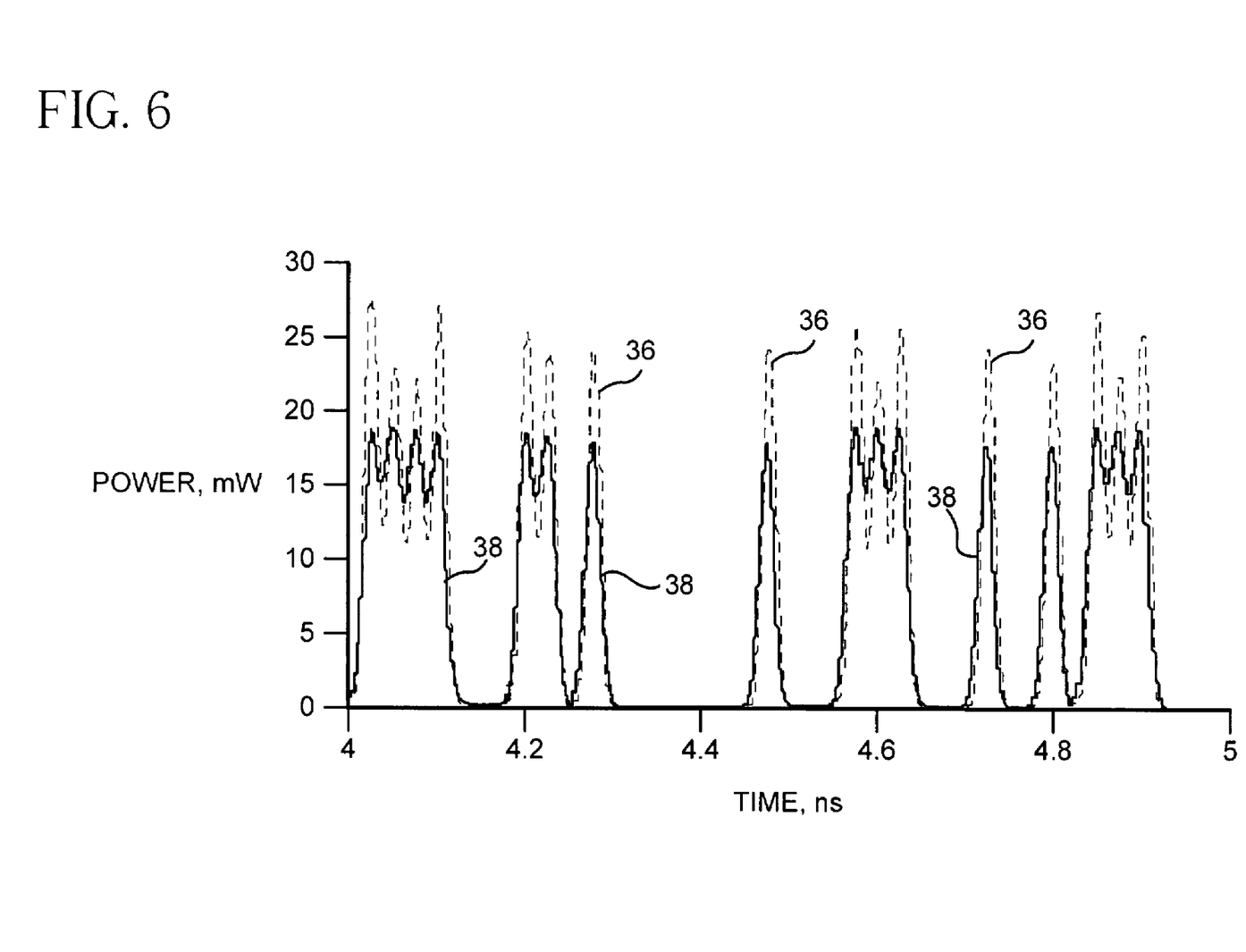
FIG. 6 is a chart comparing the intensity variations of a sequence of signal pulses in an optical system configured with and without the device in accord with the invention.

Exemplary signal pulses propagating through an optical waveguide fiber communication system such as that illustrated in FIG. 1 are shown in FIG. 6 which is a chart of pulse intensity versus time. The sequence of pulses shown as broken curve 36 propagate in a communication system which does not incorporate the device in accord with the invention. Curve 36 effectively is a display of the signal pulse intensity before the pulses enter the varying dispersion fiber 12. The variability in the intensity of pulses 36 is evident, exhibiting a maximum relative intensity difference greater than 5 dB. In comparison, the sequence of pulses illustrated by solid curve 38 in FIG. 6 have passed through the varying total dispersion fiber 12 and electrical filter 10. In this case the maximum relative intensity difference is less than about 1.4 dB and is essentially zero for neighbor and next nearest neighbor pulses. The effect of the device in accord with the invention is to lock or clamp the intensity of the pulses relative to each other. The bit error rate, as measured by Q of the communication system, is greatly reduced The design of the variation of total dispersion of fiber 12 can generally be made to provide reduced noise in optical systems including a range of transmission fiber designs, such as step index or multiple segment optical waveguide fiber core configurations. An example of a varying total dispersion fiber compatible with a high performance transmission fiber has a total dispersion that varies along the fiber length in accord with the equation A preferred form of the equation for d(L) is $$d(L) = d(0)\exp(-\Gamma L)\cosh\left[k\left(\frac{1-\exp(-\Gamma L)}{\Gamma}\right)\right]$$

where d(0) is the total dispersion at the first end of the fiber expressed in ps/nm-km, L is distance along the length of fiber in km, k is a constant, and $\Gamma$ is the attenuation coefficient of the fiber expressed in $km^{-1}$. In a preferred embodiment, d(0) is in a range from about 0.5 to 5 ps/nm-km, k is in the range from about 0.025 km to 1.5 km, and $\Gamma$ is in a range from about 0.04 to 0.08 $km^{-1}$. For a more complete explanation of this equation see *Quasi-soliton propagation in dispersion managed optical fibers*, Kumar et al., Optics Letters, Vol. 22, No. 6, Mar. 15, 1997.

EXAMPLES

The invention will be further clarified by the following examples.

Example 1

Figure 5:
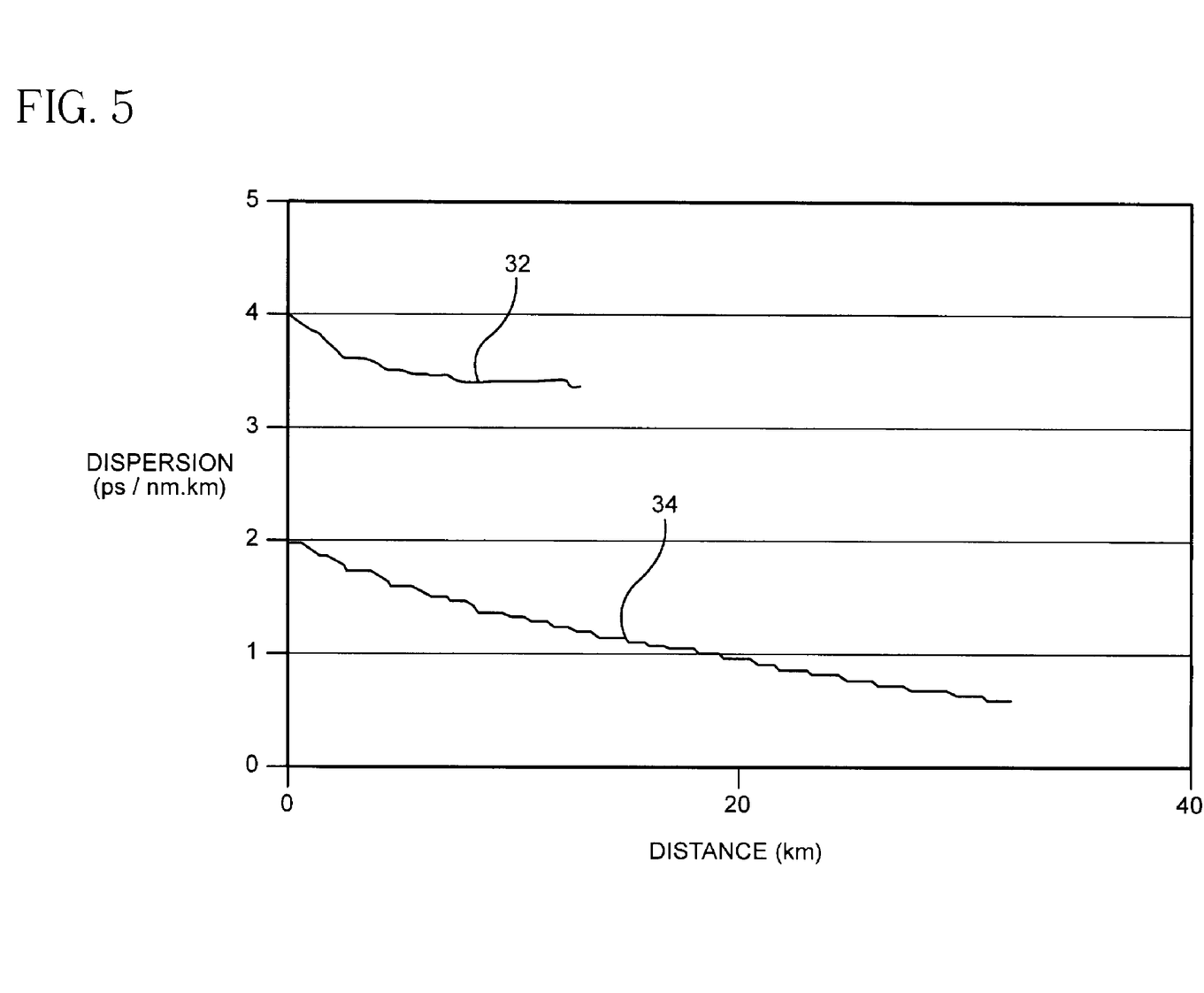
FIG. 5 is a chart of total dispersion versus fiber length of an optical waveguide fiber used in the device in accord with the invention.

An optical system in accord with the invention as illustrated in FIG. 1 is simulated using the following parameters. The input to the transmission fiber 7 in FIG. 1 is 16 channels of multiplexed pulses, in an RZ format having a 50% duty cycle, having a launch power of 0 dBm/channel. The transmission fiber 7 is a non-zero dispersion shifted fiber (NZDSF) having a dispersion of 4.5 ps/nm-km. Amplifier spacing in the simulated transmission span 1 in FIG. 1 is 80 km. Dispersion of the transmission fiber is compensated at each amplifier location so that the average dispersion per 80 km span is 1.25 ps/nm-km. The total propagation distance is 800 km. At the end of the transmission link, one of the channels is demultipexed and this channel is passed to the noise suppression device 9. An amplifier to boost the signal level is located just before the noise suppression device 9. The output of the amplifier is optically coupled to dispersion varying fiber 12. The gain of the amplifier can be so adjusted that nonlinear effects occurring in dispersion varying fibers favor noise suppression. The dispersion varying fiber 12 has a dispersion that varies along the fiber length in accord with the equations set forth above, where the particular form of the equation and choice of parameters gives the dependence of d(L) shown as curves 32 or 34 of FIG. 5. The length of this varying total dispersion fiber is taken to be 13 km (curve 32) in a first simulation and 32 km (curve 34) in a second.

Figure 2A:
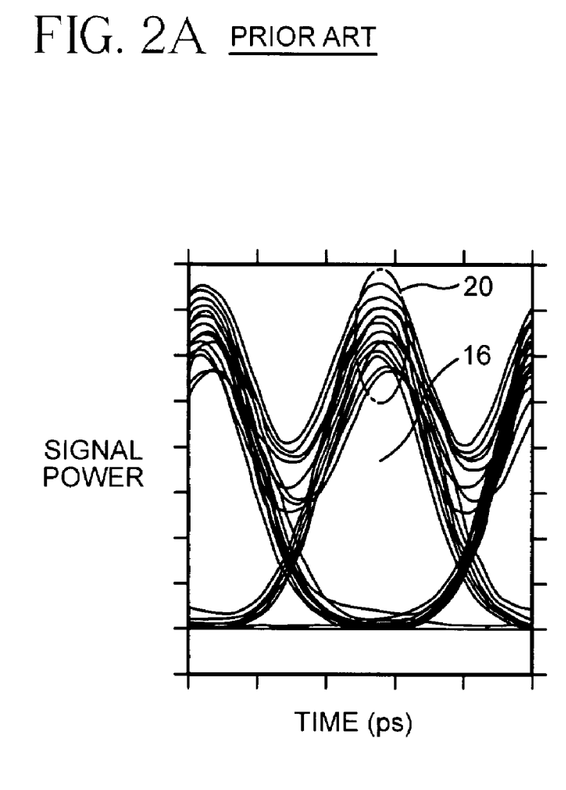
FIG. 2A is an eye-diagram of pulses in an optical system of the prior art.
Figure 2B:
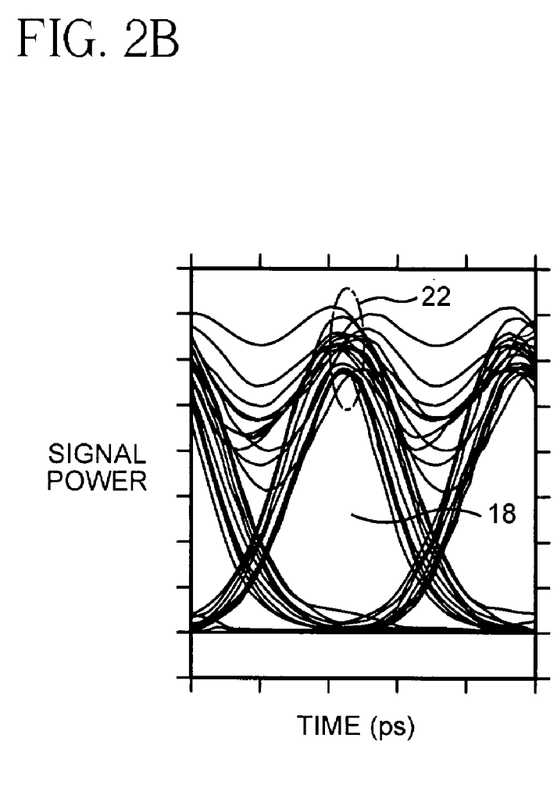
FIG. 2B is an eye-diagram of pulses in an optical system incorporating a device in accord with the present invention.

The eye-diagram, a chart of signal power in arbitrary units versus time in pico-seconds, shown in FIG. 2A, is a simulation of the signal-to-noise performance of the signal in the optical path 5 of FIG. 1 at a point in the system just before the varying total dispersion fiber 12. Eye 16 is significantly closed due to the noise, indicated by loop 20, superposed on the signal intensity. In contrast, the eye-diagram shown in FIG. 2B, a simulation of the signal-to-noise performance at a point along optical path 5 just before detector 8, exhibits a more open eye 18 due to a much diminished superposed noise level as indicated by loop 22. The broadening of the pulse in FIG. 2B in comparison to that of FIG. 2A, which can be read from the time scales of the respective horizontal axes of FIGS. 2A and 2B, is due to the removal of some higher frequency components of the signal by electrical filter 10 in FIG. 1. Dispersion compensating fiber 14 has a dispersion of about −100 ps/nm-km at 1550 nm and a dispersion slope of about 0 ps/nm²-km at 1550 nm. Length of dispersion compensating fiber 14 is adjusted from 0.2 to 0.4 km to provide the highest Q of the system. The varying total dispersion fiber serves to shift the center of the noise frequency spectrum away from the center frequency of the signal.

Figure 3:
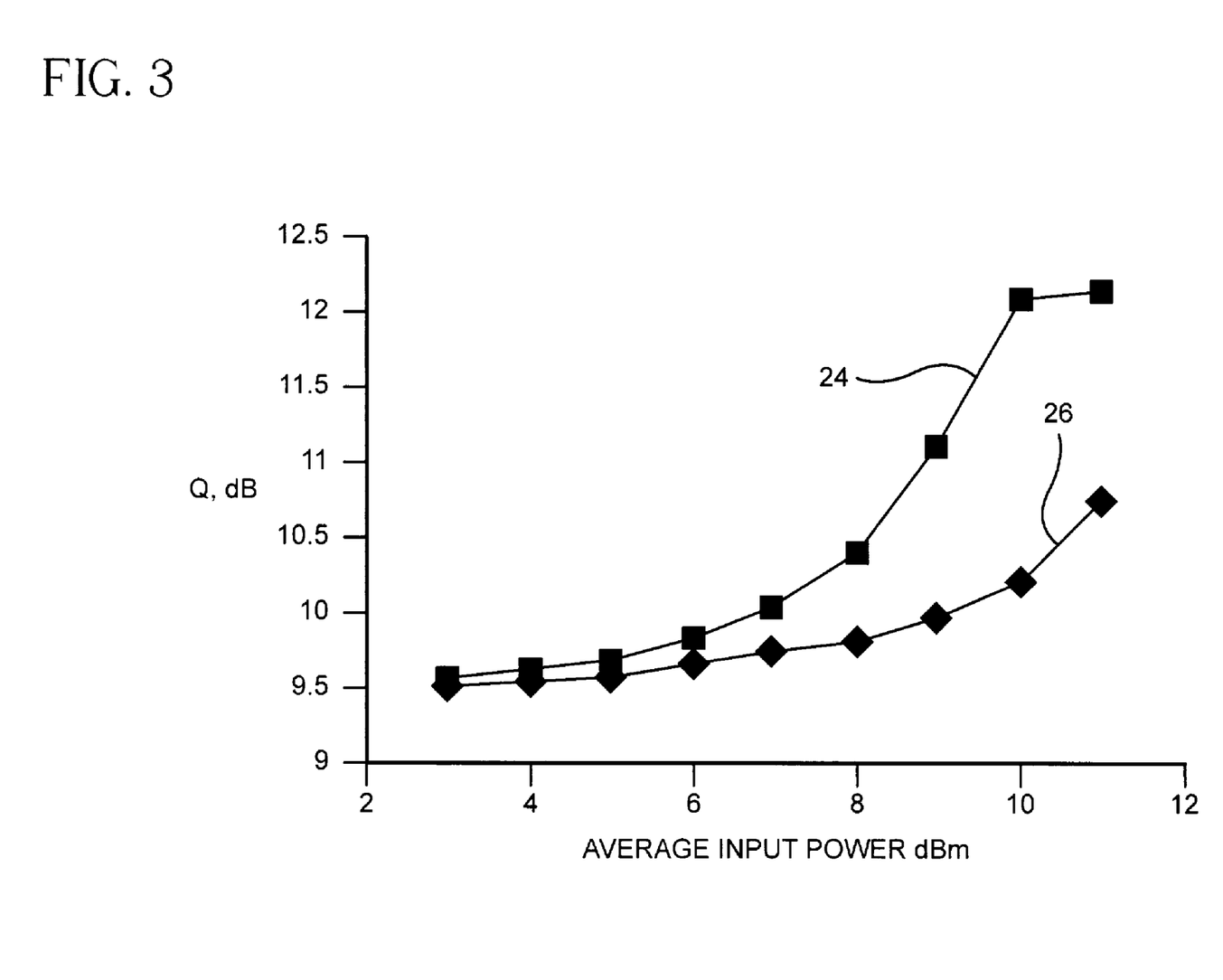
FIG. 3 is a chart of Q of an optical system incorporating a device in accord with the invention versus average power input to the device.

The additional beneficial effect of high frequency filter 10 in FIG. 1 can be seen from the simulated data charted in FIG. 3 which shows Q of the system in dB versus average signal power in dBm (0 dBm=1 mW) input to fiber 12. The Q of a waveguide fiber system is the difference between the mean photodetector current, $i_1$, when detector 8 receives a '1' or mark bit, and the the mean photodetector current, $i_0$, when detector 8 receives a '0' or space bit, divided by the sum of the respective standard deviations of the two noise currents, $\sigma_1$ and $\sigma_0$, associated with the mark and space respectively. That is $Q=(i_1-i_0)/(\sigma_1+\sigma_0)$. See *Fiber Optic Communications Systems* 2$^{nd}$ *Edition*, Agrawal, pages 172–173. In the figures, Q is expressed in dB so that Q is found from the equation, Q (dB)=10 log$_{10}$ Q. A higher Q means the detected noise is smaller compared to the signal so that the system exhibits a superior (i.e. lower) bit error rate. Curve 24 represents the system Q when the 32 km length varying total dispersion fiber is coupled into the system as fiber 12. The total dispersion at the first end of this fiber, the end nearest the transmitter, is 2 ps/nm-km. As average signal power increases from about 2 dBm to about 11 dBm, the Q of the system improves from about 9.5 dB to more than 12 dB. This improvement in Q corresponds to orders of magnitude improvement in bit-error-rate. The effect of the varying total dispersion fiber together with the high frequency filter is to make use of the non-linear effects that are typically expected as signal power increases. Curve 26 in FIG. 3 corresponds to coupling into the system a varying dispersion fiber of length 13 km and total dispersion at the first end of 4 ps/nm-km. The beneficial effect of the varying total dispersion fiber together with the high frequency filter is still evident in curve 26 but is not as marked as that shown by curve 24.

Example 2

Figure 4:
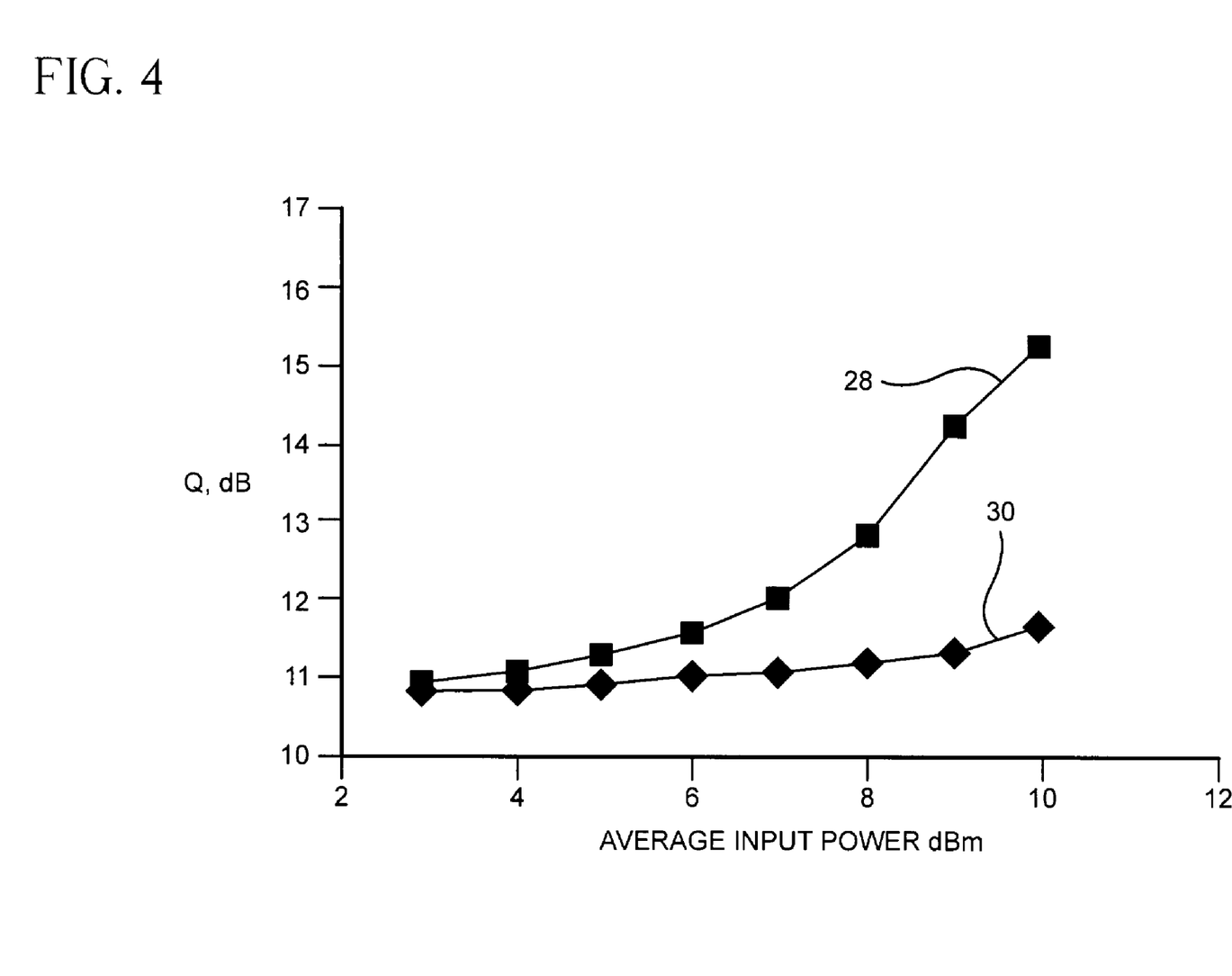
FIG. 4 is a chart of Q of and optical system incorporating a device in accord with the invention versus average power input to the device.

A second simulation is done using the optical system of FIG. 1 and the same parameters as those set forth in Example 1. In this second simulation, the noise is taken to arise solely from amplified spontaneous emission due to optical amplifiers 6. The simulation demonstrates the efficiency of the noise reduction scheme in accord with the invention in the case where a plurality of optical amplifiers are coupled into the system. A multiple-amplifier system configuration is typical of high data rate systems, such as a 40 Gb/s, return-to-zero communication system configuration. The Q of the system versus average signal power is shown in FIG. 4. Curve 28 corresponds to use of the 32 km length of varying dispersion fiber described in Example 1. As average signal power increases from about 2 dB to about 10 dB, curve 28 shows system Q improves by nearly 4.5 dBm. Curve 30 shows the effect of the 13 km varying total dispersion fiber on system Q. The effect of the 13 km fiber is still beneficial but not nearly as marked as in the simulation using the 32 km length of varying total dispersion fiber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A device to reduce noise and improve quality of optical signals in an optical communication system comprising:
   a length of optical waveguide fiber optically coupled into said optical communication system, said length of optical waveguide fiber having a first and a second end;
   a detector to detect optical signals that have passed through said length of optical waveguide fiber; and,
   an electrical noise filter electrically coupled to receive electrical signals from said detector;
   wherein, said second end of the optical waveguide fiber is located nearer the detector than said first end, said length of optical waveguide fiber has a total dispersion that varies monotonically along the fiber length, and said electrical noise filter removes noise that has a frequency higher than the center frequency of the optical signals.

2. The device of claim 1 wherein the total dispersion has a value in the range from about 2 to 4 ps/nm-km at the first end and a value in the range from about 0.5 to 3.2 ps/nm-km at the second end.

3. The device of claim 1 wherein the total dispersion decreases monotonically from the first to the second end of said length of optical waveguide fiber.

4. The device of claim 1 wherein the total dispersion d(L) varies from the first to the second end of said optical waveguide fiber in accord with the relationship, $$d(L) = d(0)\exp(-\Gamma L)\cosh\left[k\left(\frac{1-\exp(-\Gamma L)}{\Gamma}\right)\right],$$

where d(0) is the total dispersion at the first end of the fiber, k is a constant, and $\Gamma$ is the attenuation coefficient of the fiber.

5. The device of claim 4 wherein, d(0) is in a range from about 0.5 to 5 ps/nm-kin, k is in a range from about 0.025 to 1.5 km, and $\Gamma$ is in a range from about 0.04 to 0.08 km$^{-1}$.

6. The device of claim 1 further comprising a length of dispersion compensating optical waveguide fiber optically coupled in series arrangement with said length of optical waveguide fiber.

7. The device of claim 1 wherein said optical waveguide fiber propagates a signal having a signal power measured at the first end and said optical communication system has a characteristic Q value wherein, the Q value increases as the signal power input to said device increases.

8. The device of claim 7 wherein the length of said optical waveguide fiber is selected to provide a maximum value of Q.

9. The device of claim 7 wherein for the signal power input to said device in the range from about 3 dBm to about 12 dBm, Q is not less than about 9.5.

10. The device of claim 1 wherein said optical waveguide fiber is selected to shift the frequency distribution of optical noise transmitted therethrough toward a frequency higher than the center frequency of the signal.

11. A device to reduce noise and improve signal pulse quality in an optical communication system comprising:
    a length of optical waveguide fiber optically coupled into said optical communication system;
    wherein said length of optical waveguide fiber has a non-linear coefficient and a total dispersion that decreases, in accord with a dependence upon fiber length, from a first end, located nearer a transmitter of said optical communication system, to a second end, located nearer a detector of said optical communication system, and,
    wherein the dependence upon fiber length is selected to provide a signal pulse intensity that varies from pulse to pulse by less than about 1.4 dB.

12. The device of claim 11 wherein the signal pulses are propagated in a return-to-zero format.

13. The device of claim 12 wherein the dependence upon fiber length, d(L), is in accord with the relationship, $$d(L) = d(0)\exp(-\Gamma L)\cosh\left[k\left(\frac{1-\exp(-\Gamma L)}{\Gamma}\right)\right],$$

where d(0) is the total dispersion at the first end of the fiber, L is fiber length, k is a constant, and $\Gamma$ is the attenuation coefficient of the fiber.

* * * * *